UNITED STATES PATENT OFFICE.

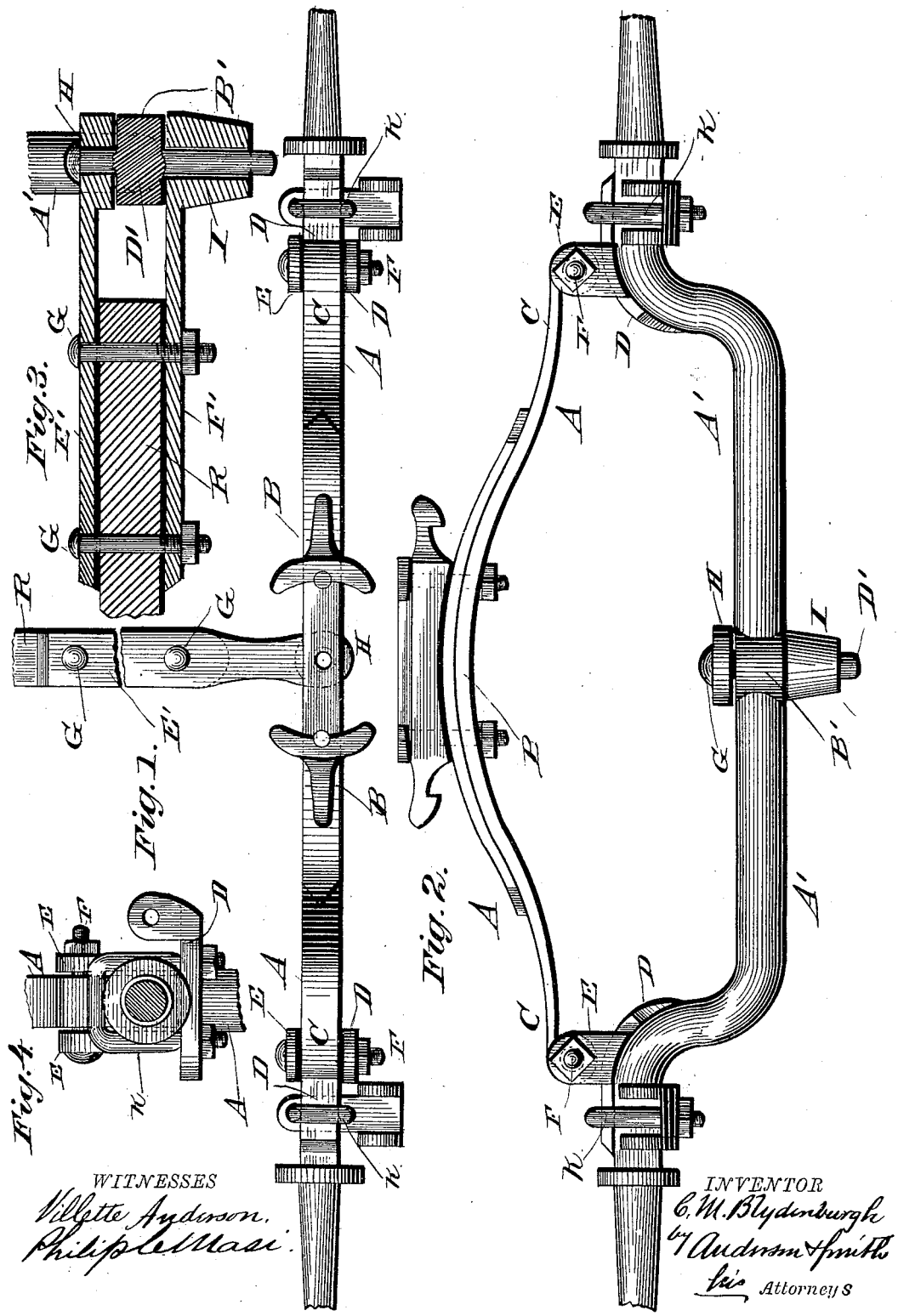

CHARLES M. BLYDENBURGH, OF RIVERHEAD, NEW YORK.

VEHICLE RUNNING-GEAR.

SPECIFICATION forming part of Letters Patent No. 371,413, dated October 11, 1887.

Application filed January 24, 1887. Serial No. 225,395. (No model.)

*To all whom it may concern:*

Be it known that I, CHARLES M. BLYDENBURGH, a citizen of the United States, and a resident of Riverhead, in the county of Suffolk and State of New York, have invented certain new and useful Improvements in Running-Gears; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a top or plan view. Fig. 2 is a front elevation. Fig. 3 is an enlarged section of the reach and its attachments, and Fig. 4 is a detail end view.

My invention relates to vehicle running-gears; and it consists in the construction and novel combination of parts, as hereinafter described and claimed.

The objects sought to be obtained in this invention are to simplify and cheapen the gear by dispensing with useless and objectionable parts, and to strengthen and make more efficient and durable the acknowledged weak parts in this class of wagon running-gears.

Heretofore in making running-gears of this class—those with a spring placed lengthwise of and on top of the axle and coupled at their ends to the axle—it has been customary to use C or scroll hangers and links. The necessity for the use of such means for coupling springs and axles is plain. Such springs are usually semi-elliptical in form, so that when they are loaded they will not straighten sufficiently to come in contact with the axle. Loading the bowed-up springs causes them to straighten and lengthen, and to allow this lengthening the ends of the springs must hang in swinging links or some such device. This method has been found to be quite objectionable, because of so much wear to the parts, breaking of links, and the rattling and loosening of parts. In these parallel spring and axle gears a reach or coupling-pole must be used, first, to prevent the axle rolling and being inverted; next, to connect the front and back axles and to hold the king-bolt on which the front axle turns. The backward and forward thrust of the load that is put upon the gears is resisted only by the king-bolt and reach. This strain soon wears the ordinary king-bolt and reach-plates away and greatly weakens the axle at this place, as the loose king-bolt soon wears the hole in the axle through which it passes very large. I remedy this serious defect by providing the axle with a large pin or king-bolt welded in a central opening in the axle, thereby producing a rigid stationary king-bolt and making or leaving the axle and king-bolt as of one solid piece, which of course prevents rattling or weakening the center of axle. I make this pin much longer than the ordinary king-bolt, and extend it above and below the axle some distance. Over the projecting ends of this king-bolt the ends of the reach-plates fit. The reach-plates are greatly thickened, and therefore present a large surface to wear against, which effectually prevents forward and backward rolling of the axle and greatly reduces the loosening by wear. The reach-plates are held in place on the reach by bolts which pass through and secure the plates and reach firmly together.

Referring to the drawings, A designates the spring attached to the front axle of a vehicle, which spring has but little upward central arch at B to avoid forward rolling as far as possible, and is provided with downward and outward convexity at its end portions, C, to compensate by the increased convexity for the flattening of the arch by a load in the vehicle, so that the ends of the spring will not move inward and outward. Each end C of the spring is connected to the axle by a coupling-piece, D, hereinafter described.

The axle A' has its central portion bent downward or cranked at suitable and equal distances from each end, and is provided with an enlarged central part, B', provided with a vertical opening, into which a king-pin, D', is welded or brazed, making it integral with the axle. The central portion of the axle is horizontal, and the coupling-pieces D D fit upon the upper surfaces of the upper parts of its cranked or downwardly-bent portions, and also upon the straight portions of the axle adjacent to and outward therefrom. The outer straight part of each coupling-piece is secured to the axle by a clip, K, and is provided with upstanding lugs E, having aligned openings, through which and through the eye in the corresponding end of the spring passes a bolt, F, which is engaged by a suitable nut on the opposite side from its head. The downwardly-curved portion of the coupling-piece D rests against the cranked parts of the axle and takes the thrust of the spring upon the lugs E, so that the spring cannot lengthen. The bent-down portions of the axle being very near the joints of the spring and coupling-pieces, the ends C cannot (when made more convex downward by the flattening of the arch B) touch any part of the axle.

R is the reach, and E' and F' are respectively the upper and lower reach-plates, secured thereto by the bolts G and corresponding nuts, and extending beyond the end of the reach, as shown.

H and I are the outer ends of the respective reach-plates, thickened and provided with central openings to receive the upper and lower extensions of the king-pin from the axle. The said thickened ends H and I cover entirely the said extensions, so as to give the king-pin the greatest amount of bearing-surface, and the upper and lower surfaces of the enlarged portion B of the axle bear against the adjacent surfaces of said ends, so that they brace the axle and prevent it from twisting or turning vertically.

The gear as described is simpler than that in common use, and is much less likely to become loose, break, or rattle, because no hanger is used to connect the spring to the axle.

Having described my invention, I claim—

1. In a vehicle-gear, the combination, with an axle having a king-pin welded to its central portion, with the ends of said pin extending above and below the axle, of the reach and the reach-plates having the thickened ends provided with openings to receive and cover the entire extensions of the king-pin, and with the upper and lower surfaces of the axle in contact with the adjacent surfaces of said thickened ends, substantially as specified.

2. In a vehicle-gear, the combination of the low-arched compensating spring, the curved coupling-pieces provided with perforated lugs, and the coupling-bolts passing through said perforations and the eyes in the ends of the springs with the downwardly-bent axle having a king-pin welded to it and projecting above and below it, the reach, the reach-plates with thickened ends provided with openings to fit and turn on the extensions of the king-pin, and the clips securing the straight parts of the coupling-pieces to the axle, substantially as specified.

3. The combination, with the axle bent downwardly near and below its ends and having its central part straight and the king-pin welded to said axle so as to be integral therewith, and projecting above and below the axle, of the reach and the reach-plates having perforated thickened ends to fit upon and turn on the extensions of the king-pin, with the upper and lower surfaces of the axle in contact with the adjacent surfaces of the said ends, substantially as specified.

In testimony whereof I affix my signature in presence of two witnesses.

CHARLES M. BLYDENBURGH.

Witnesses:
JAMES H. WARD,
FRANCIS N. FITCH.